(12) United States Patent
Kanjariya et al.

(10) Patent No.: US 11,381,500 B2
(45) Date of Patent: *Jul. 5, 2022

(54) EFFICIENT MULTICAST TRAFFIC FORWARDING IN EVPN-BASED MULTI-HOMED NETWORKS

(71) Applicant: Cisco Technology, Inc., San Jose, CA (US)

(72) Inventors: Mitesh Mukesh Kanjariya, San Jose, CA (US); Ashutosh Gupta, Dublin, CA (US); Manoj Kumar Pandey, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/911,794

(22) Filed: Jun. 25, 2020

(65) Prior Publication Data

US 2020/0328968 A1 Oct. 15, 2020

Related U.S. Application Data

(63) Continuation of application No. 16/174,713, filed on Oct. 30, 2018, now Pat. No. 10,757,017, which is a (Continued)

(51) Int. Cl.
*H04L 12/26* (2006.01)
*H04L 45/50* (2022.01)
(Continued)

(52) U.S. Cl.
CPC ............ *H04L 45/50* (2013.01); *H04L 12/185* (2013.01); *H04L 12/462* (2013.01);
(Continued)

(58) Field of Classification Search
None
See application file for complete search history.

(56) References Cited

U.S. PATENT DOCUMENTS 8,170,033 B1 5/2012 Kothari et al.
8,310,957 B1 * 11/2012 Rekhter .................. H04L 45/48
370/256

(Continued)

OTHER PUBLICATIONS

Sajassi, A., et al., "IGMP and MLD Proxy for EVPN," BESS Working Group, Internet-Draft, Oct. 17, 2015, https://tools.ietf.org/pdf/draft-sajassi-bess-evpn-igmp-mld-proxy-00.pdf.

(Continued)

*Primary Examiner* — Kwang B Yao
*Assistant Examiner* — Juvena W Loo

(57) ABSTRACT

Embodiments of the present disclosure relate to assisting forwarding of multicast traffic over Ethernet Virtual Private Network (EVPN) from a multicast source to a host multi-homed to multiple provider edge (PE) devices. Embodiments are based on the inclusion of an Ethernet Segment Identification (ESI) to EVPN type-6 routes advertised by PE devices which received a multicast Join message. Other PE devices receiving such routes are able to determine whether they belong to the ES identified by the ESI and to determine whether they are designated forwarders (DFs) for the host. Furthermore, PE devices which are the DFs are configured to re-originate the EVPN type-6 routes, i.e. re-send the advertisements, indicating themselves as DFs. This ensures that a remote PE device associated with the multicast source will also send multicast traffic to such DF PE devices, which, in turn, would allow the multicast traffic to successfully reach the host.

20 Claims, 8 Drawing Sheets

Related U.S. Application Data continuation of application No. 15/374,648, filed on Dec. 9, 2016, now Pat. No. 10,164,876.

(51) Int. Cl.
  *H04L 12/46* (2006.01)
  *H04L 12/18* (2006.01)
  *H04L 45/021* (2022.01)
  *H04L 45/02* (2022.01)

(52) U.S. Cl.
  CPC ...... *H04L 12/4633* (2013.01); *H04L 12/4641* (2013.01); *H04L 12/4662* (2013.01); *H04L 45/02* (2013.01); *H04L 45/021* (2013.01)

(56) References Cited

U.S. PATENT DOCUMENTS

| | | | |
|---|---|---|---|
| 8,451,837 | B1 | 5/2013 | Schuett et al. |
| 9,628,409 | B1 | 4/2017 | Yuvaraj et al. |
| 10,033,539 | B1* | 7/2018 | Nagarajan ............. H04L 12/185 |
| 10,057,386 | B1 | 8/2018 | Sajassi et al. |
| 10,164,876 | B2 | 12/2018 | Kanjariya et al. |
| 2009/0028166 | A1 | 1/2009 | Pushparaj et al. |
| 2011/0286452 | A1 | 11/2011 | Balus et al. |
| 2013/0031271 | A1 | 1/2013 | Bosch et al. |
| 2013/0301472 | A1 | 11/2013 | Allan |
| 2014/0126422 | A1 | 5/2014 | Bragg |
| 2014/0204762 | A1 | 7/2014 | Allan |
| 2014/0226531 | A1 | 8/2014 | Farkas et al. |
| 2014/0233369 | A1 | 8/2014 | Salam et al. |
| 2015/0092780 | A1 | 4/2015 | Li |
| 2015/0207640 | A1* | 7/2015 | Teng ..................... H04L 45/507 370/390 |
| 2016/0119156 | A1* | 4/2016 | Drake ..................... H04L 45/16 709/223 |
| 2016/0134528 | A1 | 5/2016 | Lin et al. |
| 2016/0241911 | A1* | 8/2016 | Shah ................ H04N 21/64322 |
| 2016/0261487 | A1 | 9/2016 | Singh et al. |
| 2016/0277210 | A1* | 9/2016 | Lin .......................... H04L 45/66 |
| 2016/0345054 | A1* | 11/2016 | Dhaipule ............. H04L 65/4076 |
| 2017/0093611 | A1 | 3/2017 | Arora et al. |
| 2017/0093794 | A1 | 3/2017 | Natu et al. |
| 2017/0093834 | A1 | 3/2017 | Natu et al. |
| 2017/0099180 | A1 | 4/2017 | Singh et al. |
| 2017/0141998 | A1 | 5/2017 | Singh et al. |
| 2017/0195199 | A1 | 7/2017 | Dorai et al. |
| 2017/0195210 | A1 | 7/2017 | Jacob et al. |
| 2017/0195220 | A1 | 7/2017 | Sivaraj et al. |
| 2017/0201389 | A1 | 7/2017 | Tiruveedhula et al. |
| 2017/0250904 | A1* | 8/2017 | Singarayan ............. H04L 45/66 |
| 2017/0288948 | A1 | 10/2017 | Singh et al. |
| 2017/0339052 | A1 | 11/2017 | Arora et al. |
| 2017/0373973 | A1 | 12/2017 | Bickhart et al. |
| 2018/0006995 | A1 | 1/2018 | Bickhart et al. |
| 2018/0034646 | A1* | 2/2018 | Kuramoto ............. H04L 9/3268 |
| 2018/0034648 | A1 | 2/2018 | Nagarajan et al. |
| 2018/0034665 | A1 | 2/2018 | Nguyen et al. |
| 2018/0091445 | A1 | 3/2018 | Singh et al. |
| 2018/0176121 | A1* | 6/2018 | Jayaraman ............. H04L 45/00 |

OTHER PUBLICATIONS

Sajassi, A., et al., "BGP MPLS-Based Ethernet VPN," IETF, RFC 7432, Feb. 2015, 56 pages https://www.rfc-editor.org/rc/pdfrfc/rfc7432.txt.pdf.

Zhang, J., et al., "EVPN BUM Procedure Updates," 95tn IETF, Apr. 3, 2016, https://www.ietf.org/proceedings/95/slides/slides-95-bess-1.pdf.

\* cited by examiner

EFFICIENT MULTICAST TRAFFIC FORWARDING IN EVPN-BASED MULTI-HOMED NETWORKS

CROSS-REFERENCE TO RELATED APPLICATIONS

This application is a continuation of U.S. application Ser. No. 16/174,713, filed Oct. 30, 2018, which is in turn a continuation of U.S. patent application Ser. No. 15/374,648, filed Dec. 9, 2016, now U.S. Pat. No. 10,164,876, the entire contents of which are incorporated herein by reference.

TECHNICAL FIELD

This disclosure relates in general to the field of communications and, more particularly, to methods and systems for forwarding of multicast traffic in Ethernet Virtual Private Network multi-homed networks.

BACKGROUND

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

BRIEF DESCRIPTION OF THE DRAWINGS

To provide a more complete understanding of the present disclosure and features and advantages thereof, reference is made to the following description, taken in conjunction with the accompanying FIGURES, wherein like reference numerals represent like parts, in which.

DETAILED DESCRIPTION OF EXAMPLE EMBODIMENTS

Overview

Figure 1:
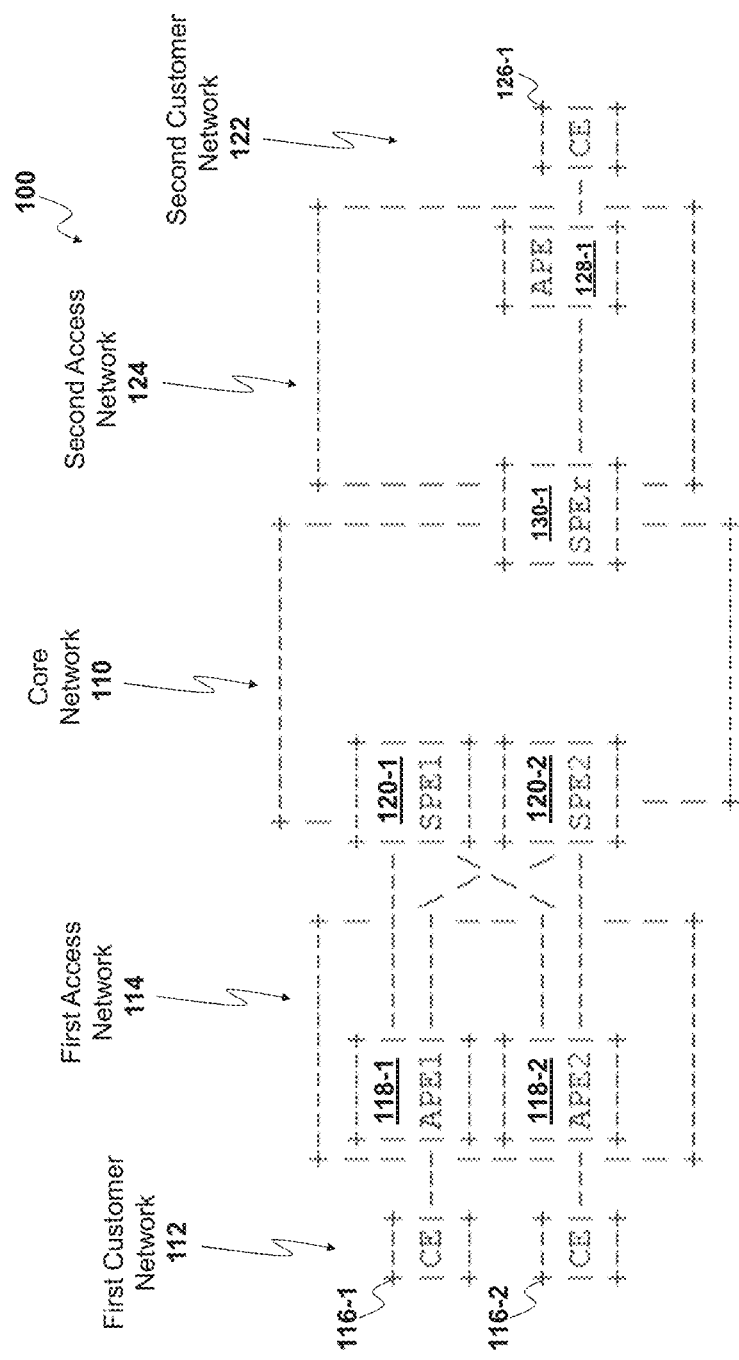
FIG. 1 illustrates a schematic block diagram of an example network environment, according to some embodiments of the present disclosure.

Various embodiments of the present disclosure relate to assisting forwarding of multicast traffic over Ethernet Virtual Private Network (EVPN) from a multicast source to a host destination that expressed interest in receiving the multicast traffic, the host destination being multi-homed to multiple provider edge (PE) devices (sometimes interchangeably referred to as "PE nodes" or "service PE (SPE) devices/nodes"). As used herein, the term "multicast source" (sometimes interchangeably referred to as a "multicast source device") refers to any computing/storage device that functions as a source of distributing multicast content, while the term "host destination" (sometimes interchangeably referred to as host, host device, or customer/client device) refers to any computing/storage device that consumes multicast content. PE devices are network elements that assist in delivering multicast traffic from the multicast source to one or more hosts. As used herein, the term "network element" is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. A network element may include any suitable hardware, software, components, modules, or interfaces that facilitate the operations thereof, and may be inclusive of appropriate algorithms and communication protocols that allow for the effective exchange of data or information.

In one aspect of the present disclosure, a computer-implemented method to be performed by a PE device that is not the designated forwarder (DF) for the multi-homed host is proposed. The method includes receiving, at a PE device not elected, out of said plurality of PE devices, to be a designated forwarder (DF) for said host device (non-DF PE device), an Internet Group Management Protocol (IGMP) join message; and sending, by the non-DF PE device, a route advertisement message that includes an Ethernet Segment (ES)-Import Route Target (RT) when the IGMP join message is received at a port, of the non-DF PE device, that is associated with an Ethernet Segment Identification (ESI) for a set of Ethernet communication links between said host device and each of the plurality of PE devices to which the host device is multi-homed to. In an embodiment, such advertisement may include sending one or more Border Gateway Protocol (BGP) update messages, in particular BGP type-6 route advertisements, including network layer reachability information (NLRI) for the multicast group address for which IGMP join message was received.

In another aspect of the present disclosure, a computer-implemented method to be performed by a PE device that is the designated forwarder (DF) for the multi-homed host is proposed. The method includes receiving, at a PE device elected, out of said plurality of PE devices, to be a designated forwarder (DF) for said host device (DF PE device), a route advertisement message; determining, by the DF PE device, that the route advertisement message includes an Ethernet Segment (ES)-Import Route Target (RT); establishing, by the DF PE device, that the ES-Import RT matches an Ethernet Segment Identification (ESI) for an Ethernet communication link between said host device and the DF PE device (i.e., establishing that the RT in said advertisement message matches one of the ESIs local to the DF PE device); and sending, by the DF PE device, a further route advertisement message, wherein the second route advertisement message includes said ES-Import RT and an EVPN Instance RT (i.e. the DF PE re-originates (i.e. sends) the received update message by adding an EVPN Instance RT to it).

A functional entity performing embodiments of the methods described herein may be referred to in the following as a "multi-homed EVPN multicast forwarding system" (where the word "system" does not imply or limit its implementation to a system). Such a functional entity could be implemented within any network element or distributed among a plurality of network elements associated with multi-homed EVPN networks, e.g. in PE devices.

As will be appreciated by one skilled in the art, aspects of the present disclosure, in particular the functionality related to various aspects of assisting forwarding of multicast traffic over EVPN from a multicast source to a host described herein, may be embodied in various manners. Accordingly, other aspects of the present disclosure relate to systems, computer programs, mechanisms, and means for carrying out the methods according to various embodiments described herein. Such systems, computer programs, mechanisms, and means could be included within various network devices, such as e.g. switches and routers, in particular within PE devices. A computer program may, for example, be downloaded (updated) to the existing network devices and systems (e.g. to the existing routers, switches, various control nodes, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the method according to various embodiments described herein.

In yet another aspect, the present application relates to data structures for assisting forwarding of multicast traffic over EVPN from a multicast source to a host, e.g. data structures configured to carry various indications described herein, e.g. data structures representing update messages, or parts thereof, described herein.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be easily learned by the practice of the principles set forth herein.

Network Environment: Basics of Multi-Homed EVPN Networks

For purposes of illustrating the techniques for assisting forwarding of multicast traffic over EVPN from a multicast source to a host, described herein, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

As previously described herein, a computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

A service provider network can provide service to customer networks via network elements referred to as Provider Edge (PE) devices (e.g. routers or switches) that are located at the edge of a service provider network. The PE devices in a service provider network may be connected by an Multi-Protocol Label Switching (MPLS)/Internet Protocol (IP) network/infrastructure that provides benefits such as fast-reroute and resiliency. The PE devices may also be connected by an IP infrastructure that utilizes Generic Routing Encapsulation (GRE) tunneling or other IP tunneling between the PE devices.

In some cases, each PE device may be connected directly to a host or a Customer Edge (CE) device, where the term "CE device" (also referred to as a "CE node" or simply "CE") refers to a network element located at the edge of a customer network and serving as a communications medium for one or more hosts in the customer network which are connected to it. In other cases, an Access Network (AN) may provide connectivity via Ethernet Virtual Circuits (EVCs) in order to interconnect PE and hosts/CE devices. In some instances, the AN can be an Ethernet Access Network (EAN) that can support EVCs by utilizing encapsulations as described in IEEE 802.1Q "Virtual LANs" protocol, included herein in its entirety. Alternatively, the AN can be a IP or a MPLS network that can support EVCs by utilizing Ethernet over IP encapsulation or Ethernet over MPLS encapsulation, respectively.

In the following, unless specified otherwise, descriptions referring to a "host" refer both to hosts connected to the PE device(s) or ANs directly as well as to hosts connected to the PE device(s) or ANs via their corresponding CE devices. Furthermore, unless specified otherwise, descriptions provided herein are applicable to various forms of encapsulation known in the art.

EVPN can support single-homed devices, single-homed networks, multi-homed devices and multi-homed networks. A multi-homed host device or a CE multi-homed network can tolerate certain network failures because the connection of the host or a CE device at the edge of the CE multi-homed network to two or more PE devices provides additional redundancy. In particular, in the case where a host is multi-homed to two or more PE devices, the set of Ethernet links between the host (possibly via the CE device) and these PE devices enables providing the additional redundancy. Such a set of Ethernet links between the host and the PE devices to which the host is multi-homed to is said to form an Ethernet Segment (ES) having a certain ES identifier (ESI). When a host is multi-homed to two or more PE devices (referred to, collectively, as a "Redundancy Group"), one of the PE devices that is configured to forward BUM (Broadcast, Unknown Unicast and multicast) traffic to the host is referred to as a "Designated Forwarder" (DF). The other PE devices in the Redundancy Group are then referred to as "non-Designated Forwarder" (non-DF).

FIG. 1 illustrates a network topology as described above. As shown in FIG. 1, a network 100 may be considered to include a core network 110 providing connectivity between two or more customer networks, shown in the example of FIG. 1 with a first customer network 112 and a second customer network 122. In the example of FIG. 1, each of the customer networks 112, 122 is connected to the core network 110 via a respective AN, shown in FIG. 1 as a first access network 114 connecting the first customer network 112 and as a second access network 124 connecting the second customer network 122 to the core network 110. Each of the customer networks 112, 122 may include a plurality of hosts which may connect to the respective access network 114, 124 via CE devices/nodes, shown in the example of FIG. 1 as two CE devices 116-1 and 116-2 for the first customer network 112 and as one CE device 126-1 for the customer network 122. Hosts in the customer networks are not specifically shown in FIG. 1.

Each of the ANs 114, 124 may include one or more Access PE devices (APEs), shown in the Example of FIG. 1 as APEs 118-1 and 118-2 in the first AN 114 and one APE 128-1 in the second AN 124. The APEs may provide a Virtual Private Wire Service (VPWS) to the connected CEs using a suitable protocol, e.g. using Ethernet over MPLS (EoMPLS) pseudowires per RFC 5462 ("Multiprotocol Label Switching (MPLS) Label Stack Entry: "EXP" Field Renamed to "Traffic Class" Field"), included herein in its entirety. The access pseudowires terminate on the PE devices, shown in the example of FIG. 1 as two PE devices SPE1 120-1 and SPE2 120-2 on the side of the first customer network 112 and one PE device SPEr 130-1 on the side of the second customer network 122. The PE devices provide inter-subnet forwarding between the hosts/CE devices, i.e. L3VPN service between them. To provide redundancy, pseudowires from a given APE/CE/host can terminate on two or more PEs forming a Redundancy Group. This provides multi-homed interconnect of APEs, and therefore their corresponding CEs and hosts behind these CEs, to PEs. For example, service PE devices PE1 and PE2 form a Redundancy Group in that each of CE devices 116, or hosts behind these devices, may be connected to both of PE1 and PE2.

A person of ordinary skill in the art will recognize that the topology illustrated in FIG. 1 is only one example and that, in other implementations, any other number of customer networks, CE devices within each customer network, and PE devices within a provider network may be used. Furthermore, the letter "r" in context of PE device SPEr 130-1 merely indicates that, in this and some following illustrative examples PE devices on the side of the first customer network 112 are considered "local" and PE devices on the side of the second customer network 122 are considered "remote."

EVPN-Based Multi-Homing and Multicasting

Request For Comments (RFC) 7432 by the Internet Engineering Task Force (IETF), entitled "BGP MPLS-Based Ethernet VPN" and included by reference herein in its entirety, defines Ethernet VPN (EVPN). EVPN is a layer 2 VPN technology built over a Packet Switched Network (PSN) (e.g. utilizing an Multi-Protocol Label Switching (MPLS)/Internet Protocol (IP) infrastructure). EVPN instances include CE devices that are connected to PE devices that form the edge of the core network infrastructure. An EVPN instance can include one or more broadcast domains (e.g. one or more VLANs) that are assigned to a given EVPN instance by the provider of the EVPN service. EVPN provides advanced multi-homing capabilities and uses Border Gateway Protocol (BGP) to distribute customer/client Media Access Control (MAC) address (C-MAC) reachability information over the core network, e.g. over the core MPLS/IP network. The solution outlined in the RFC 7432 is increasingly applied in services ranging from service provider (SP) applications to data center (DC) applications (e.g. DC applications for network virtualization overlay (NVO) services), to data center interconnect (DCI) services, etc.

One area where EVPN-based multi-homed networks are used is multicasting, i.e. distribution of content such as e.g. streaming media (e.g. Internet television) or multipoint videoconferencing to multiple interested receivers over an IP network infrastructure. Interested host receivers send Join and Leave messages to multicast sources that define their membership in a particular multicast group. By sending a Join message, a host receiver indicates its desire to join a multicast group (i.e. join other host receivers in receiving multicast traffic). By sending a Leave message, a host receiver receiving multicast traffic in a particular multicast group indicates its desire to leave the multicast group (i.e. stop receiving multicast traffic of this group). For example, in case of Internet television, when a user changes from a first TV channel to a second TV channel, the host receiver of the user will send a Leave message to end its membership in the multicast group of the first TV channel and will send a Join message to establish its membership in the multicast group of the second TV channel.

An integral part of IP multicast is an Internet Group Management Protocol (IGMP), which is a communications protocol currently used by hosts and adjacent routers on IPv4 networks to establish multicast group memberships. An IETF draft entitled "IGMP and MLD Proxy for EVPN," included herein by reference in its entirety, describes how to support hosts, referred to in the draft as "endpoints," running Internet Group Management Protocol (IGMP) for multicast services over an EVPN network by incorporating IGMP proxy procedures on EVPN provider edge (PE) devices. In particular, as a part of the proposed procedures for forwarding of multicast traffic over EVPN fabric, the draft proposes a new EVPN route-type called Selective Multicast Ethernet Tag (SMET) route (also referred to as an "EVPN type-6 route") to be advertised by all of the PE devices having multicast host receivers behind them.

One challenge with the solution proposed in the draft arises from the fact that, when a host generates an IGMP Join message for a particular multicast group, e.g. multicast group G1, the Join message is sent to only one of the PE devices in the Redundancy Group to which the host is multi-homed. The PE device which received the Join message will then advertise the SMET route in the EVPN fabric to express interest in getting multicast traffic for G1 and will start receiving the multicast traffic for G1 from the multicast source. However, if this PE device happens to be the non-DF for the host, then it cannot forward the received multicast traffic to the host, resulting in the PE device swallowing/blackholing of multicast traffic for the host. This issue would present itself every time when an IGMP Join message happens to be sent to a PE device that is not the DF for the host.

Proposed Solution for Efficient Forwarding of Multicast Traffic Over EVPN

Figure 2:
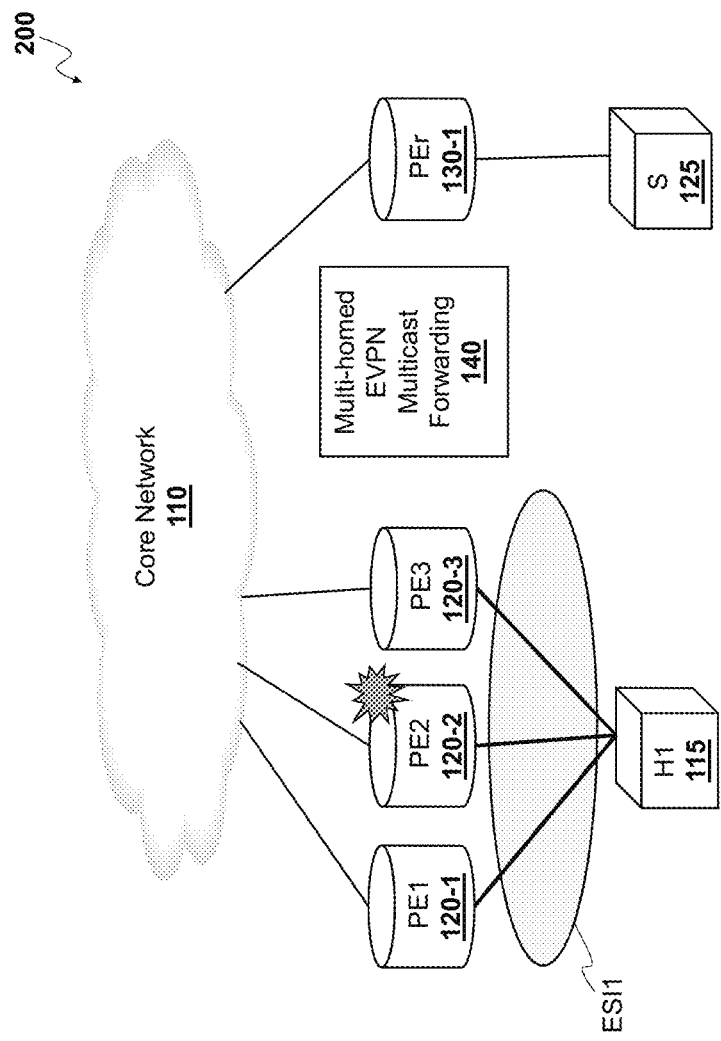
FIG. 2 illustrates a schematic block diagram of an example network environment using use multi-homed EVPN multicast forwarding system for assisting forwarding of multicast traffic, according to some embodiments of the present disclosure.
Figure 3:
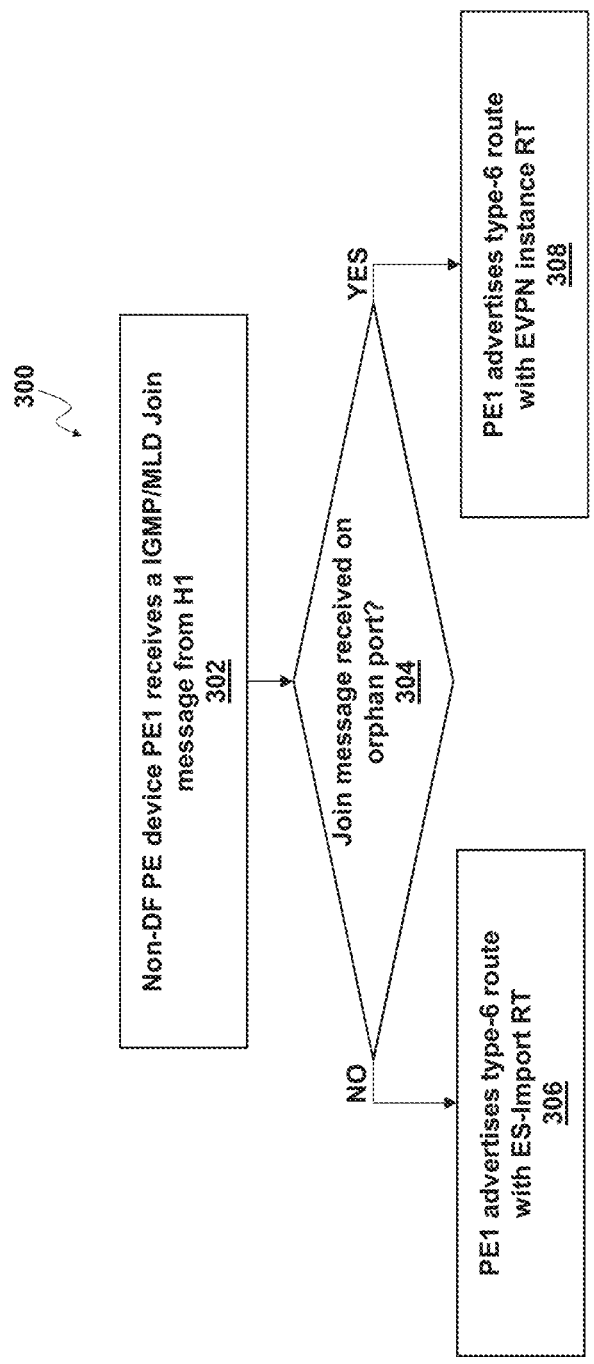
FIG. 3 is a flow diagram of a method for assisting forwarding of multicast traffic in EVPN-based multi-homed networks carried out by a non-DF PE device that received a Join message from a host, according to some embodiments of the present disclosure.
Figure 4:
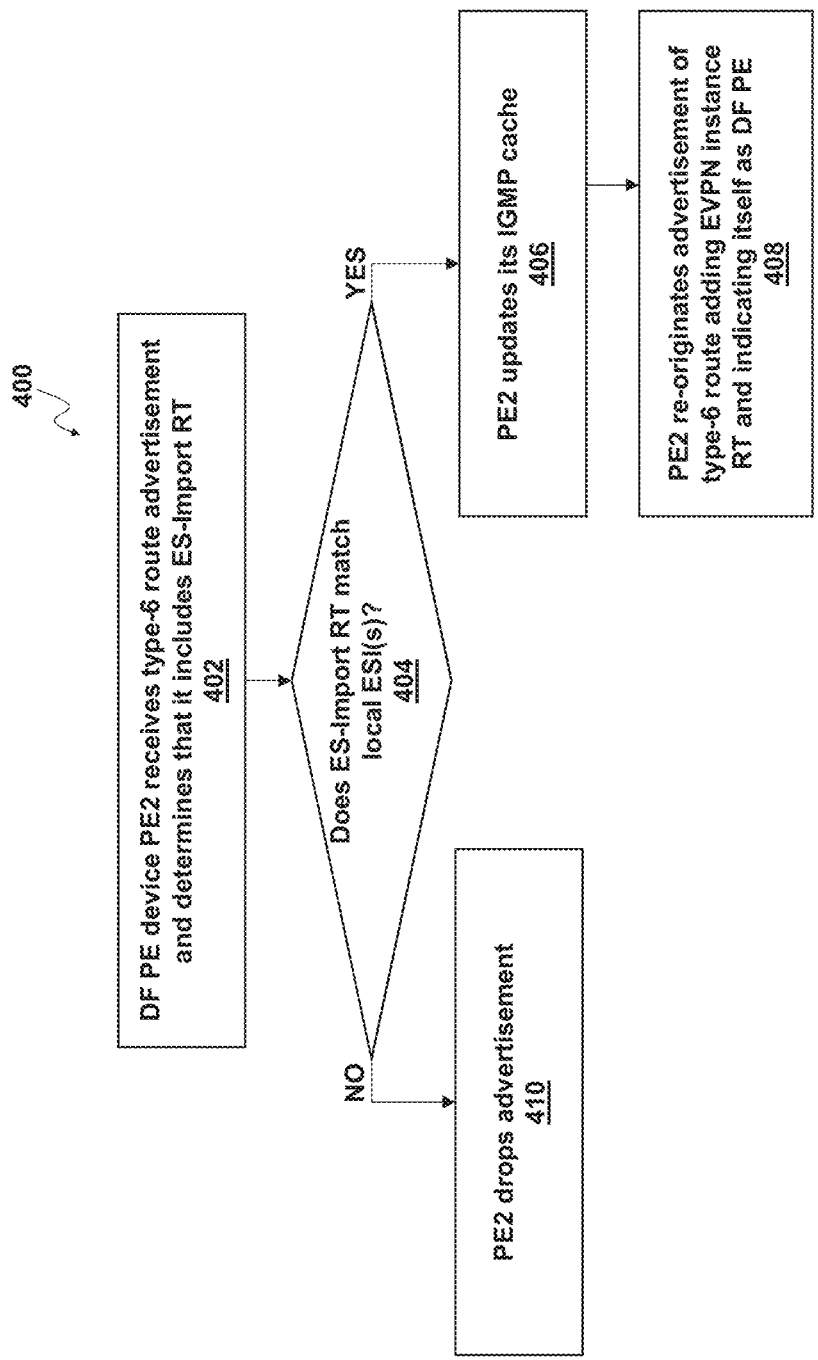
FIG. 4 is a flow diagram of a method for assisting forwarding of multicast traffic in EVPN-based multi-homed networks carried out by a DF PE device that received an EVPN type-6 advertisement, according to some embodiments of the present disclosure.
Figure 5:
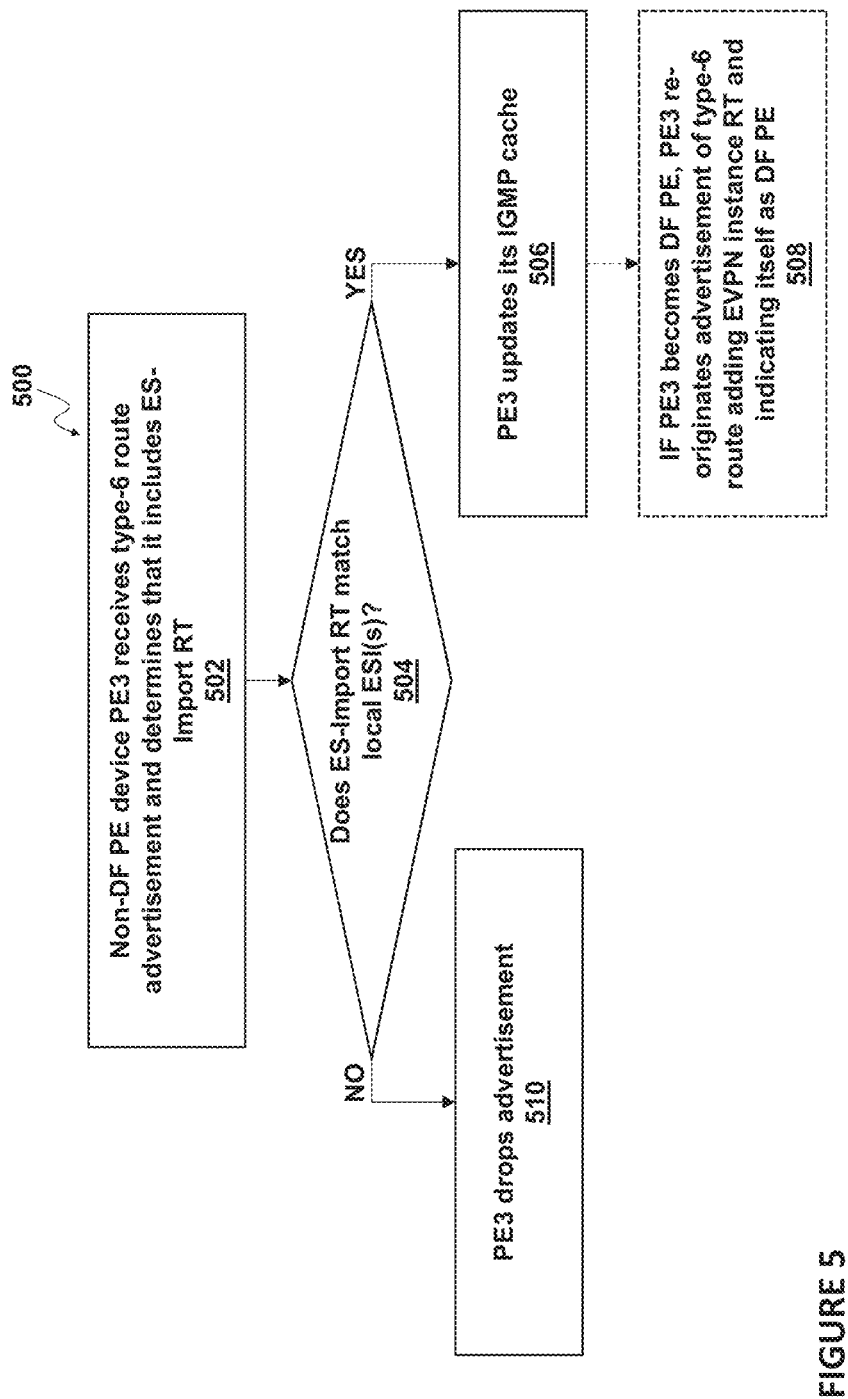
FIG. 5 is a flow diagram of a method for assisting forwarding of multicast traffic in EVPN-based multi-homed networks carried out by a non-DF PE device that received an EVPN type-6 advertisement, according to some embodiments of the present disclosure.
Figure 6:
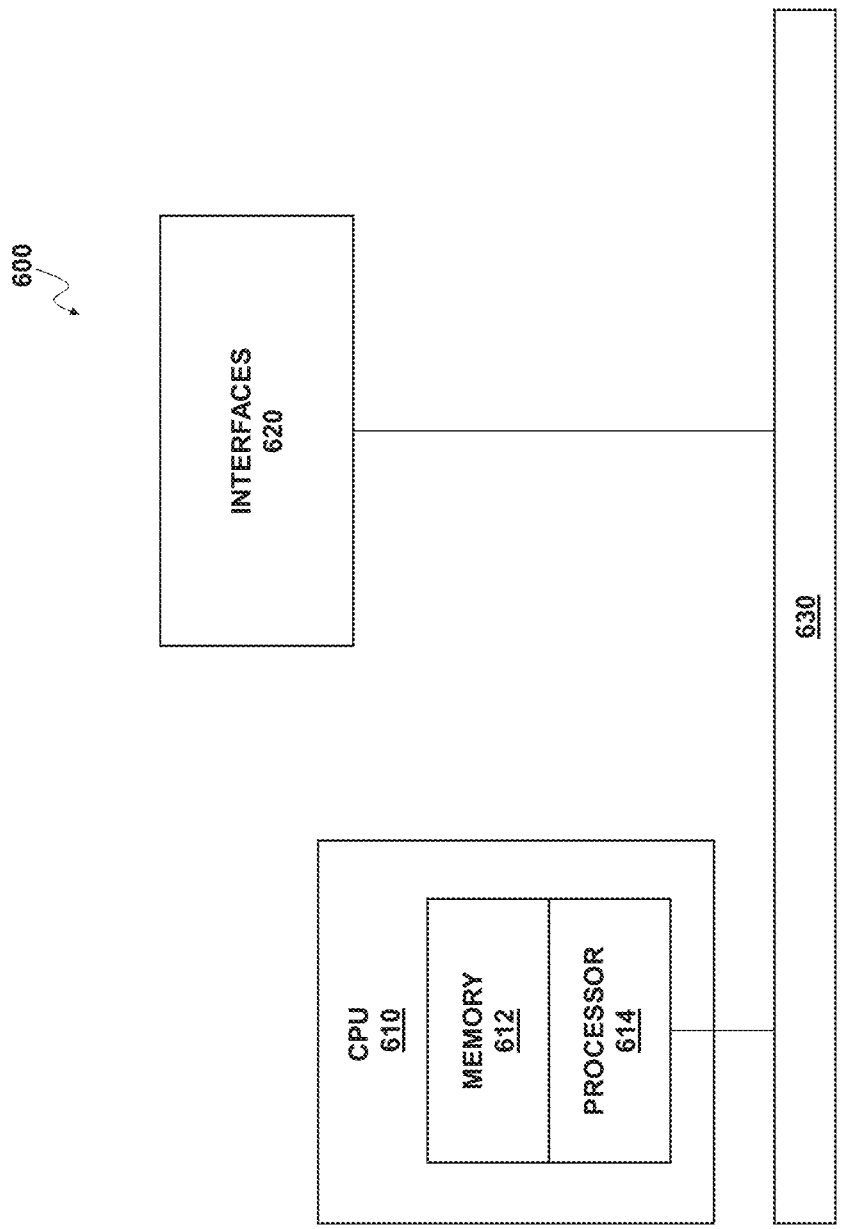
FIG. 6 illustrates an example network device suitable for implementing various embodiments of the present disclosure.
Figure 7:
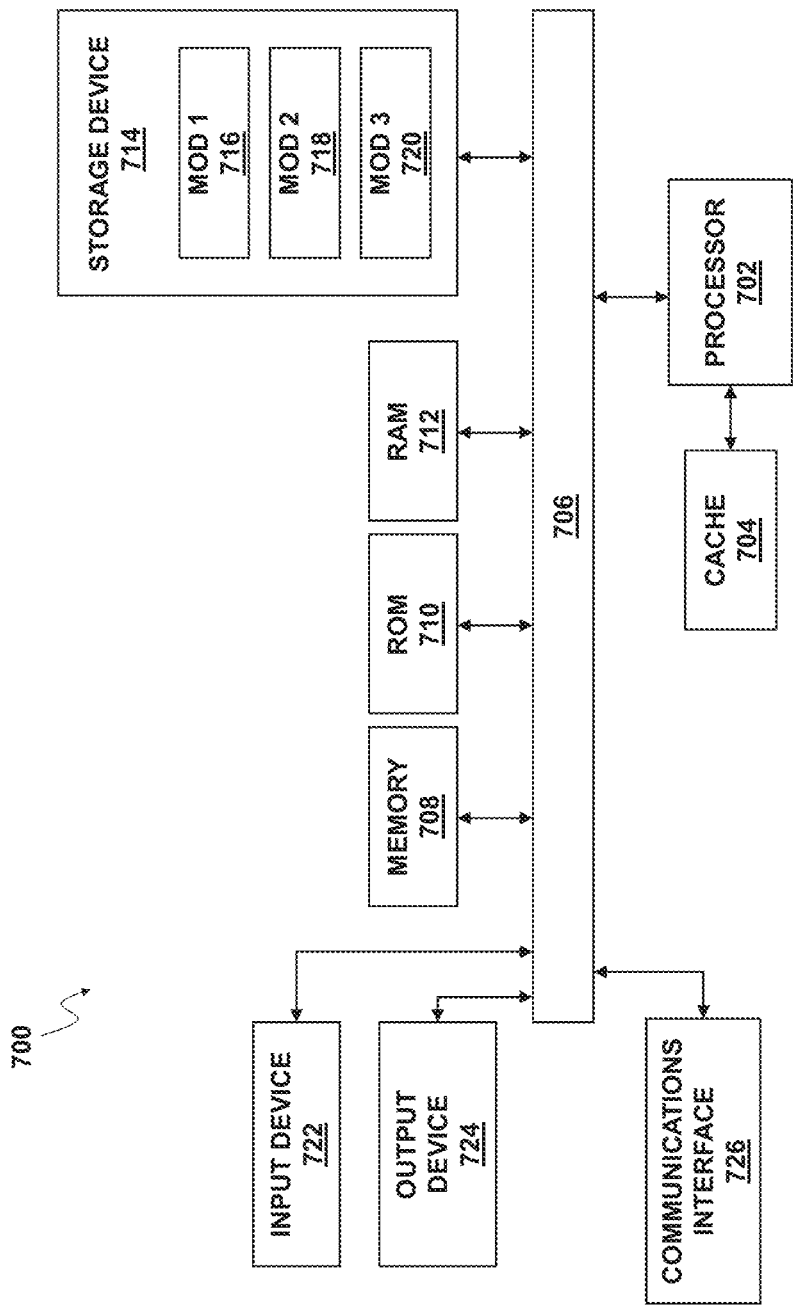
FIGS. 7 and 8 illustrate example systems, according to some embodiments of the present disclosure.
Figure 8:
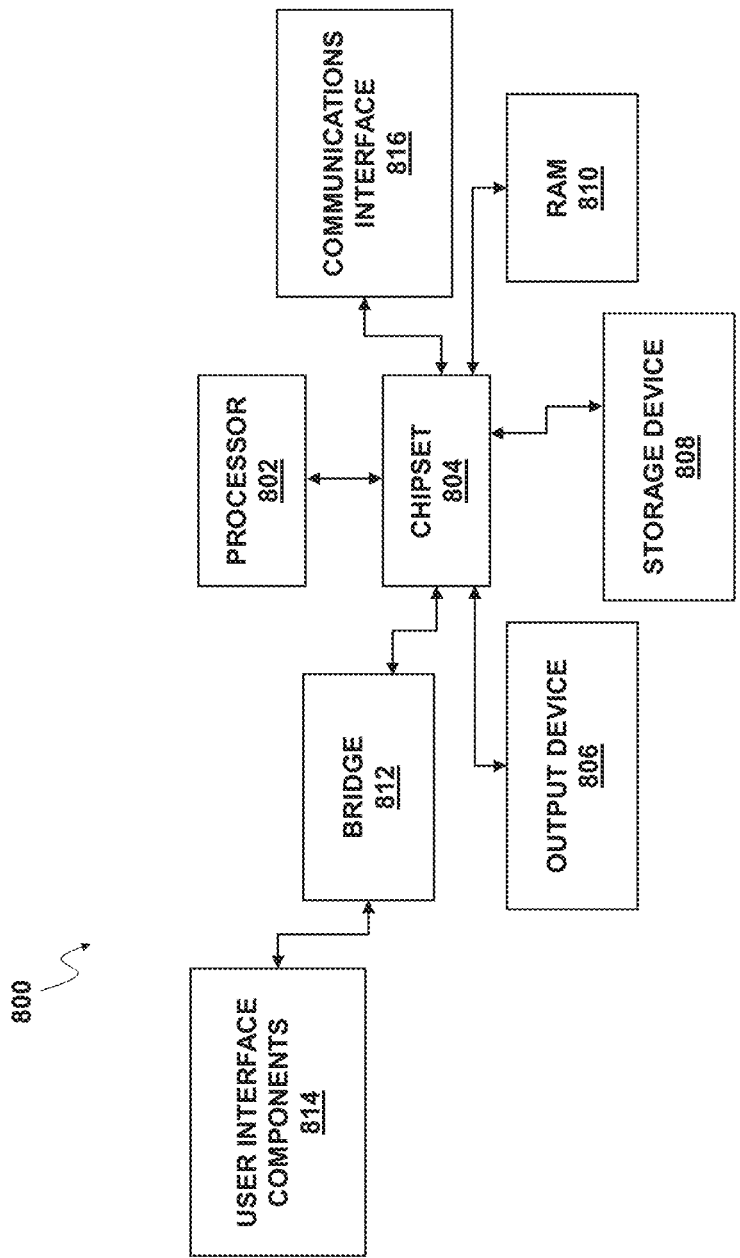

Methods described herein address the need in the art for providing a more efficient forwarding of multicast traffic in EVPN-based multi-homed networks. In particular, methods described herein may provide an improvement for the problem described above where a non-DF PE device may attract multicast traffic for a host but would be unable to forward the traffic to the host. Disclosed are systems, methods, and computer-readable storage media for assisting improved forwarding of multicast traffic over EVPN from a multicast source to a host. A description of an exemplary network environment, as illustrated in FIG. 2, is first disclosed herein. A discussion of a functionality of a multi-homed EVPN multicast forwarding system proposed herein will then follow, including examples and variations of methods performed by various nodes of the multi-homed EVPN multicast forwarding system in accordance with embodiments of the present disclosure as illustrated in FIGS. 3-5. The discussion concludes with a brief description of example devices, as illustrated in FIGS. 6-8. These variations shall be described herein as the various embodiments are set forth. The disclosure now turns to FIG. 2.

FIG. 2 illustrates a schematic block diagram of an example network environment using multi-homed EVPN multicast forwarding system for assisting forwarding of multicast traffic from a multicast source S 125 to a multicast group G1. FIG. 2 illustrates a scenario where a host H1 115 has sent an IGMP join report/message for the multicast group G1, according to some embodiments of the present disclosure. FIG. 2 may be considered to be an alternative representation of the network 100 shown in FIG. 1 in that analogous elements are shown in both FIGURES. These analogous elements are given the same reference numerals in these FIGURES. Unless specified otherwise, discussions provided for these elements in association with one of the FIGS. 1 and 2 are applicable to the other FIGURE and, therefore, in the interests of brevity, are not repeated for both FIGURES.

The example shown in FIG. 2 illustrates that a host H1 is multi-homed to three PE devices—PE1 120-1, PE2 120-2, and PE3 120-3, i.e. these PE devices form a Redundancy Group for H1. All pseudowires associated with a given host, e.g. pseudowires from the host H1 to each of the PE1-PE3, are considered collectively as a Virtual Ethernet Segment (vES) [Virtual-ES], identified by a certain ES indicator (ESI), from the perspective of the EVPN PEs. These pseudowires are indicated in FIG. 2 as links labeled with an identifier ESI1. As used herein, the term "pseudowire" referes to a link, e.g. an Ethernet link, communicatively connecting a host/CE to a particular PE so that data may be exchanged between these entities. In other words, a set of Ethernet links between H1 and each of the PE devices of the Redundancy Group for H1 forms an ES identified by ESI1.

FIG. 2 shows a star provided in a top right corner of PE2 to represent that, for illustrative purposes, PE2 is assumed to be the DF PE at this time. Thus, PE1 and PE3 are both non-DF for H1.

The example shown in FIG. 2 further illustrates that a multicast source S is homed to a PE device PEr 130-1, the remote PE (PEr) as described above.

FIG. 2 further illustrates a multi-homed EVPN multicast forwarding system 140 configured to implement embodiments for assisting forwarding of multicast traffic over EVPN from the multicast source S to the host H1, as described herein. The system 140 is intended to illustrate a functional entity which could be implemented within any network element or distributed among a plurality of network elements associated with multi-homed EVPN networks, e.g. in PE devices 120-1, 120-2, 120-3, and 130-1, and causing these network elements to carry out functionality as described herein.

Elements of FIG. 2 may be coupled to one another through one or more interfaces employing any suitable connections (wired or wireless), which provide viable pathways for network communications. Additionally, one or more of these elements may be combined, divided, or removed from the architecture based on particular configuration needs. For ease of illustration, not all elements of FIG. 2 are depicted with communication lines traversing the network environment 200.

In the network environment 200, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node and a destination node via a network. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Those skilled in the art will recognize that the number of devices shown and the specific configuration shown in the network environment 200 is for illustrative purposes and does not limit applications of the embodiments disclosure herein. Network environments that include additional and/or different components and connections are contemplated herein and are within the scope of the present disclosure. For example, the network environment 200 can include any number of provider edge (PE) devices, not necessarily devices PE1-PE3 and PEr as shown in FIG. 2. Furthermore, although CE devices are not specifically shown in FIG. 2, as previously described herein, one of both of H1 and S can be behind a respective CE device, e.g. H1 can be connected to one of the CE devices 116-1 and 116-2 shown in FIG. 1, while S can be connected to the CE device 126-1 shown in FIG. 1. Furthermore, although also not specifically shown in FIG. 2, respective access networks may connect each of the host H1 and the source S to their PE devices, such as e.g. first access network 114 and second access network 124 shown in FIG. 1.

In general, methods for assisting forwarding of multicast traffic over EVPN from a multicast source S to a multi-homed host H1, presented herein, are based on the inclusion of an ESI to EVPN type-6 routes advertised by PE devices which received a multicast join message. Other PE devices receiving such type-6 routes are then able to determine whether they belong to the same ES as identified by the ESI included in the route and to determine whether they are designated forwarders for the host associated with the ESI. Furthermore, PE devices which are the designated forwarders are configured to re-originate the EVPN type-6 routes, i.e. re-send the advertisements, indicating themselves as designated forwarders. This ensures that a remote PE device associated with the multicast source will also send multicast traffic to such designated forwarder PE devices, which, in turn, would allow the multicast traffic to successfully reach the host. Details of this approach are now discussed with reference to the functionality of PE devices illustrated in the example of FIG. 2, with reference to methods illustrated in FIGS. 3-5. Even though operations of each of the methods are described with reference to the exemplary elements shown in FIG. 2, any EVPN multi-homed system configured to perform operations as described herein is within the scope of the present disclosure.

FIG. 3 is a flow diagram of a method 300 for assisting forwarding of multicast traffic an EVPN-based multi-homed network, e.g. in the network environment 200, carried out by a non-DF PE device that received a Join message from a host, according to some embodiments of the present disclosure. The example of the network environment 200 shown in FIG. 2 assumed that PE2 was the DF PE device, meaning that PE1 and PE3 are non-DF devices. For purposes of explanation of FIGS. 3-5, it is assumed that PE1 is the non-DF that receives a Join message from H1, as shown in FIG. 3 with step 302. Functionality of PE1 illustrated in FIG. 3 may be carried out by at least a part of the multi-homed EVPN multicast forwarding system 140, which may be included within, or communicatively connected to the PE1, enabling PE1 to function as shown in FIG. 3.

The Join message received by the PE1 at 302 may e.g. be an IGMP Join message. As described above, an IGMP join message is a message sent by downstream hosts in order to indicate their desire to receive multicast traffic, as described in the Internet Draft "IGMP and MLD Proxy for EVPN."

At 304, the device that received the Join message determines whether the message was received on one of its ESI ports or on one of orphan ports. In general, a port of a PE device that is associated with a particular ESI (i.e. an Ethernet communication link between the PE device and a host device associated with that ESI, an Ethernet communication link being a part of an Ethernet Segment identified by that ESI) is referred to as an "ESI port" or an "ESI port-channel." On the other hand, a port of a PE device that is not associated with any ESIs is referred to as an "orphan port." Thus, at 304, PE1 determines whether the Join message received at 302 was received at one of its orphan ports.

Next, at 306 and 308, PE1 advertises an EVPN type-6 route message, e.g. as described in the IETF draft entitled "IGMP and MLD Proxy for EVPN," described above, where, depending on whether or not the Join message was received from the host on an ESI port or on an orphan port of PE1, PE1 includes different additional information in this advertisement message. In both cases, the advertisement message sent by PE1 at 306 and 308 may be a BGP update message, i.e. a route advertisement message, advertising one or more IP prefixes of one or more hosts, which IP prefixes were received at the PE1 from the hosts as a part of one or more IGMP join messages. For example, the IGMP Join message sent by the host H1 in 302 would include reachability information for multicast group, i.e. the IP prefix for G1. Such an update message may be a SMET route message as described e.g. in section 5 of the IETF draft entitled "IGMP and MLD Proxy for EVPN." A SMET Route is a BGP EVPN route used to carry IGMP or Multicast Listener Discovery (MLD) membership reports.

Upon determining that the Join message is not received on an orphan port, but on an ESI port, as would be the case for the example illustrated in FIG. 2 because there is an Ethernet communication link between the host H1 that sent the Join message and PE1, PE1 proceeds, at 306, to advertise EVPN type-6 route message, e.g. as described in the IETF draft entitled "IGMP and MLD Proxy for EVPN," described above. In addition, PE1 adds to the type-6 route message an ES-Import Route Target (RT) indicating the ESI of the ESI port on which PE1 received the Join message. ES-Import RT is a transitive Route Target extended community, as defined in RFC 7432, in particular in section 7.6 of the RFC 7432, carried with the Ethernet Segment route. When used, it enables all PEs connected to the same multi-homed site to import the Ethernet Segment routes.

If, on the other hand, at 304 the PE1 determined that the Join message was received on one of its orphan ports, as could be the case if a host not having an Ethernet link to PE1 would send the Join message which was hashed out to PE1 (not shown in FIG. 2), then PE1 would proceed, at step 308 shown in FIG. 3, to advertise the EVPN type-6 message as described in the IETF draft entitled "IGMP and MLD Proxy for EVPN" but now adding an EVPN instance RT (i.e. a non-ES-Import RT) as described in RFC 7432 included herein by reference in its entirety.

In the embodiments where VXLAN encapsulation is used, the EVPN instance RT may be a Route-Import RT that can be auto-derived by the PE1 from a Virtual Network Instance (VNI) label allocated to the VLAN/Bridge-Domain in which join message was received, i.e. the RT included in the type-6 route in step 308 could be a VNI-based RT. Adding the VNI-based RT to the update message sent by a non-DF PE device allows remote BGP peers that have EVPN instance with the same VNI label to import the route.

On the other hand, in the embodiments where MPLS encapsulation is used, the EVPN instance RT may be a Route-Import RT that can be auto-derived by the PE1 from an MPLS label identified in the received orphan Join message, i.e. the RT included in the type-6 route in step 308 could be an MPLS-based RT. Adding the MPLS-based RT to the update message sent by a non-DF PE device allows remote BGP peers that have EVPN instance with the same MPLS label to import the route.

In still other embodiments, the EVPN instance RT is a Route-Import RT that can be configured by the operators. Adding this RT to the type-6 route update message sent by a non-DF PE device allows remote BGP peers (of the sending non-DF PE device) which are RT configured for the EVPN instance to import the route.

FIGS. 4 and 5 illustrate how other PE devices handle receipt of the advertisement sent by PE1 according to the method 300.

FIG. 4 is a flow diagram of a method 400 for assisting forwarding of multicast traffic in an EVPN-based multi-homed network, e.g. in the network environment 200, carried out by a DF PE device that received an EVPN type-6 advertisement, according to some embodiments of the present disclosure. The example of the network environment 200 shown in FIG. 2 assumed that PE2 was the DF PE device and the example further assumed in FIG. 3 that PE1 was the non-DF device that received a Join message from H1 and sent an EVPN type-6 advertisement as explained in steps 306 and 308 in FIG. 3. Thus, the advertisement message received by PE2 at step 402 shown in FIG. 4 is the advertisement message sent by PE1 either in 306 or 308. Functionality of PE2 illustrated in FIG. 4 may be carried out by at least a part of the multi-homed EVPN multicast forwarding system 140, which may be included within, or communicatively connected to the PE2, enabling PE2 to function as shown in FIG. 4.

At 402, PE2 receives the EVPN type-6 route message as described e.g. in the Internet Draft "IGMP and MLD Proxy for EVPN." The method shown in FIG. 4 is provides for situation where PE2 determines that the route advertisement message received at 402 includes an ES-Import RT, as would be the case for the advertisements sent in step 306 shown in FIG. 3.

At 404, triggered by the receipt of the advertisement at 402, PE2 determines whether ES Import-RT in the received advertisement one of the ESIs of PE2. In other words, PE2 determines whether the ESI present in the received advertisement is local to PE2, i.e. whether PE2 has an Ethernet link to a host within the same ES.

Upon positive determination of step 404, at 406, PE2 updates its IGMP cache. As is known in the art, an IGMP cache is a synchronization listing stored on all PE devices for the purpose of keeping track of multicast receiver state. At 406, PE2 updates its IGMP cache with the multicast group along with ESI and other data as described in the Internet Draft "IGMP and MLD Proxy for EVPN." This enables PE2 to forward multicast traffic for the group G1 towards PE1 if there is any future source gets attached at PE2. PE2 also is able to determine that it is the DF for the ESI identified in the received advertisement by running a DF-election algorithm locally, e.g. as described in RFC 7432.

PE2 is then configured to also re-originate the advertisement, as shown with step 408 in FIG. 4, i.e. send the advertisement received at 402, but now also adding an EVPN instance RT, as described above, to the advertisement (i.e. the re-originated advertisement sent at 408 includes both the ES-Import RT that it had originally and now also the EVPN instance RT) and indicating itself as the DF for this ESI and, therefore, for the host H1. The latter indication may be provided by e.g. setting a dedicated flag in the update message that indicates that the message is sent by a DF PE device. Thus, the additional advertisement sent at 408 may also be, similar to the advertisement received at 402, an EVPN type-6 route BGP update message, e.g. as described in the IETF draft entitled "IGMP and MLD Proxy for EVPN," described above, now including still further information in it.

If, later, PE2 ceases to be the DF for ESI1, then PE2 may withdraw the routes it advertised at 408 based on the information contained in its IGMP cache. Ways for withdrawing BGP routes are known in the art and, therefore, not described here.

If, at 404, PE2 determines that the ESI present in the received advertisement is not local to PE2, then, at 410, PE2 drops this advertisement.

As described above, the method 400 illustrates situations where the type-6 route advertisement received by PE2 includes an ES-Import RT (i.e. the non-DF PE device that sent it received the Join message from the host on one of its ESI ports), as would be the case for the advertisements sent in step 306 shown in FIG. 3. In case the type-6 route advertisement received by PE2 would include an EVPN Instance RT (i.e. the non-DF PE device that sent it received the Join message from the host on one of its orphan ports), as would be the case for the advertisements sent in step 308 shown in FIG. 3, then PE2 would accept the route advertised in the message and update its IGMP cache accordingly (i.e. update the cache as described above), but it would not re-originate the message as is done in step 408 described above.

FIG. 5 is a flow diagram of a method 500 for assisting forwarding of multicast traffic in an EVPN-based multi-homed network, e.g. in the network environment 200, carried out by a non-DF PE device that received an EVPN type-6 advertisement, according to some embodiments of the present disclosure. The example of the network environment 200 shown in FIG. 2 assumed that PE2 was the DF PE device and the example further assumed in FIG. 3 that PE1 was the non-DF device that received a Join message from H1 and sent an EVPN type-6 advertisement as explained in steps 306 and 308 in FIG. 3. Thus, the non-DF PE device receiving the advertisement message in FIG. 5 is the non-DF PE device PE3. Functionality of PE3 illustrated in FIG. 5 may be carried out by at least a part of the multi-homed EVPN multicast forwarding system 140, which may be included within, or communicatively connected to the PE3, enabling PE3 to function as shown in FIG. 5.

At 502, PE3 receives the EVPN type-6 route message, the same as is described above for PE2 receiving the message at 402. The method shown in FIG. 5 is provides for situation where PE3 determines that the route advertisement message received at 502 includes an ES-Import RT, as would be the case for the advertisements sent in step 306 shown in FIG. 3.

At 504, similar to 404, triggered by the receipt of the advertisement at 502, PE3 determines whether ES Import-RT in the received advertisement matches one of the ESIs of PE3. In other words, PE3 determines whether the ESI present in the received advertisement is local to PE3 whether the ESI present in the received advertisement is local to PE3, i.e. whether PE3 has an Ethernet link to a host within the same ES.

Upon positive determination of step 504, at 506, PE3 updates its IGMP cache in a manner analogous to that described above for step 404 of FIG. 4. Unlike the DF PE device PE2 which also re-originated the advertisement as described above with step 408 of FIG. 4, PE3 does not re-originate the advertisement because it is not the DF for this ESI/host. However, if later PE3 becomes the DF for this ESI/host, then it uses the information in the IGMP cache updated at 504 to re-originate the advertisement received at 502 by including information as a DF PE is configured to include, as described above for step 406 of FIG. 4. Such a situation is shown in FIG. 5 with a step 508, shown with dashed lines because this illustrates a hypothetical situation which may or may not happen (i.e. PE3 may or may not eventually become a DF PE for H1).

If, at 504, PE3 determines that the ESI present in the received advertisement is not local to PE3, then, at 510, PE3 drops the advertisement.

As described above, the method 500 illustrates situations where the type-6 route advertisement received by PE3 includes an ES-Import RT (i.e. the non-DF PE device that sent it received the Join message from the host on one of its ESI ports), as would be the case for the advertisements sent in step 306 shown in FIG. 3. In case the type-6 route advertisement received by the non-DF PE device PE3 would include an EVPN Instance RT (i.e. the non-DF PE device that sent it received the Join message from the host on one of its orphan ports), as would be the case for the advertisements sent in step 308 shown in FIG. 3, then PE3 would also updates its IGMP cache, as described above, but not re-originate the BGP update.

On the remote side (i.e. on the side of the PE devices, including the PEr 130 connected to the multicast source S), the remote PE devices would receive type-6 route advertisements sent by both the non-DF PE, as described in FIG. 3, and as re-originated by the DF PE, as described in FIG. 4. The remote PE devices would process them as known in the art and PEr 130 would start sending multicast traffic for multicast group G1, which H1 joined, to all PE devices from which it received a type-6 route advertisement with an EVPN Instance RT. Note that, as described above, PEr would receive a type-6 route from the non-DF PE1 only if PE1 received the Join message from the host H1 on its orphan port. Thus PEr 130 would start sending multicast traffic to at least PE2 (because the DF PE2 is configured to re-originate the type-6 route with the EVPN Instance RT) and possibly to PE1 (if PE1 received the Join message on an orphan port). Since H1 is a multi-homed host and PE1 is not its DF, if PE1 receives multicast traffic from PEr, it would not be able to forward the traffic to the host H1. However, because PE2 is the DF for H1, it will now be able to forward the traffic received from the PEr of the multicast source to the host H1.

Since PE devices in the Redundancy Group of H1 keep the IGMP entry in their IGMP cache, once DF PE device for H1 changes, the new DF PE device for H1 will be able to re-originate the EVPN route (as described above with step 508), the remote PE devices will receive the new advertisement and start sending multicast traffic to the new DF for H1, thus maintaining the flow of multicast content to H1.

As the foregoing description illustrates, functionality of the multi-homed EVPN multicast forwarding system 140 proposed herein includes steps which may be performed by various entities—such as e.g. at least one non-DF PE and a DF PE, as well as by one or more of the remote PEs. Steps of the methods shown in FIGS. 3-5 are described with reference to the elements and to the exemplary configuration of the network environment 200, and with reference to the scenario described above where PE2 is the original DF PE device and PE1 is the non-DF PE device that received the Join message from the host device first. Based on the descriptions provided herein, these steps could be easily extended to other configurations and other network environments, all of which are within the scope of the present disclosure.

Exemplary Devices

FIG. 6 illustrates an example network device 600 suitable for implementing various embodiments of the present disclosure, e.g. embodiments related to assisting forwarding of multicast traffic in an EVPN-based multi-homed network. In various embodiments, the network device 600 could be any one of or could be communicatively connected to in order to configure any one of the PE devices described herein, e.g. the network device may be used to implement the multi-homed EVPN multicast forwarding system 140 to enable functionality of various PE devices as described above.

As shown in FIG. 6, the network device 600 includes a master central processing unit (CPU) 610, interfaces 620, and a bus 630 (e.g., a PCI bus). When acting under the control of appropriate software or firmware, the CPU 610 is responsible for executing packet management, error detection, and/or routing or forwarding functions. The CPU 610 can accomplish all these functions under the control of software including an operating system and any appropriate applications software. CPU 610 may include one or more processors 614 such as a processor from the Motorola family of microprocessors or the MIPS family of microprocessors. In an alternative embodiment, processor 614 is specially designed hardware for controlling the operations of network device 600. In a specific embodiment, a memory 612 (such as non-volatile RAM and/or ROM) also forms part of CPU 610. However, there are many different ways in which memory could be coupled to the system.

The interfaces 620 are typically provided as interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 610 to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 612) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIGS. 7 and 8 illustrate example systems, according to some embodiments of the present disclosure. The more appropriate embodiment will be apparent to those of ordinary skill in the art when practicing the present technology. Persons of ordinary skill in the art will also readily appreciate that other system embodiments are possible.

Systems such as the ones shown in FIGS. 7 and 8 are also suitable for implementing various embodiments of the present disclosure, e.g. embodiments related to assisting forwarding of multicast traffic in an EVPN-based multi-homed network. In various embodiments, such systems could be any one of or could be communicatively connected to in order to configure any one of the PE devices described herein, e.g. the network device may be used to implement the multi-homed EVPN multicast forwarding system 140 to enable functionality of various PE devices as described above.

FIG. 7 illustrates a conventional system bus computing system architecture 700 wherein the components of the system are in electrical communication with each other. Exemplary system 700 includes a processing unit (CPU or processor) 702, communicatively connected to a system bus 706. The system bus 706 couples various system components to the processor 702, the system components including e.g. a system memory 708, a read only memory (ROM) 710, and a random access memory (RAM) 712. The system 700 can include a cache 704 of high-speed memory connected directly with, in close proximity to, or integrated as part of the processor 702. The system 700 can copy data from the memory 708 and/or the storage device 714 to the cache 704 for quick access by the processor 702. In this way, the cache 704 can provide a performance boost that avoids processor 702 delays while waiting for data. These and other modules can control or be configured to control the processor 702 to perform various actions. Other system memory 708 may be available for use as well. The memory 708 can include multiple different types of memory with different performance characteristics. The processor 702 can include any general purpose processor and a hardware module or software module, such as module 1 716, module 2 718, and module 3 720 stored in the storage device 714, configured to control the processor 702 as well as a special-purpose processor where software instructions are incorporated into the actual processor design. The processor 702 may essentially be a completely self-contained computing system, containing multiple cores or processors, a bus, memory controller, cache, etc. A multi-core processor may be symmetric or asymmetric.

To enable user interaction with the computing device 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing device 700. The communications interface 726 can generally govern and manage the user input and system output. There is no restriction on operating on any particular hardware arrangement and therefore the basic features here may easily be substituted for improved hardware or firmware arrangements as they are developed.

Storage device 714 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 712, read only memory (ROM) 710, and hybrids thereof.

The storage device 714 can include software modules 716, 718, 720 for controlling the processor 702. Other hardware or software modules are contemplated. The storage device 714 can be connected to the system bus 706. In one aspect, a hardware module that performs a particular function can include the software component stored in a computer-readable medium in connection with the necessary hardware components, such as the processor 702, bus 706, display 724, and so forth, to carry out the function.

FIG. 8 illustrates an example computer system 800 having a chipset architecture that can be used in executing the described method and generating and displaying a graphical user interface (GUI). Computer system 800 is an example of computer hardware, software, and firmware that can be used to implement the disclosed technology. System 800 can include a processor 802, representative of any number of physically and/or logically distinct resources capable of executing software, firmware, and hardware configured to perform identified computations. Processor 802 can communicate with a chipset 804 that can control input to and output from processor 802. In this example, chipset 804 outputs information to output 806, such as a display, and can read and write information to storage device 808, which can include magnetic media, and solid state media, for example. Chipset 804 can also read data from and write data to RAM 810. A bridge 812 for interfacing with a variety of user interface components 814 can be provided for interfacing with chipset 804. Such user interface components 814 can include a keyboard, a microphone, touch detection and processing circuitry, a pointing device, such as a mouse, and so on. In general, inputs to system 800 can come from any of a variety of sources, machine generated and/or human generated.

Chipset 804 can also interface with one or more communication interfaces 816 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 802 analyzing data stored in storage 808 or 810. Further, the machine can receive inputs from a user via user interface components 814 and execute appropriate functions, such as browsing functions by interpreting these inputs using processor 802.

It can be appreciated that example systems 700 and 800 can have more than one processor 702, 802, or be part of a group or cluster of computing devices networked together to provide greater processing capability.

Selected Examples

Example 1 provides a computer-implemented method for assisting forwarding of multicast traffic over an Ethernet Virtual Private Network (EVPN) fabric from a multicast source to a host device multi-homed to a plurality of provider edge (PE) devices. The method includes receiving, at a PE device not elected, out of said plurality of PE devices, to be a designated forwarder (DF) for said host device (non-DF PE device), an Internet Group Management Protocol (IGMP) join message; and sending, by the non-DF PE device, a route advertisement message that includes an Ethernet Segment (ES)-Import Route Target (RT) when the IGMP join message is received at a port, of the non-DF PE device, that is associated with an Ethernet Segment Identification (ESI) for a set of Ethernet communication links between said host device and each of the plurality of PE devices to which the host device is multi-homed to.

Example 2 provides Example provides the method according to Example 1, where the route advertisement message is a Selective Multicast Ethernet Tag (SMET) route message of Border Gateway Protocol (BGP), i.e. a route advertisement message advertising one or more Internet Protocol (IP) prefixes of one or more hosts, which IP prefixes were received at said non-DF PE device from said one or more hosts as a part of the IGMP join message.

Example 3 provides the method according to Example 2, where the route advertisement message includes an EVPN Instance RT when the IGMP join message is received at a port of the non-DF PE device that is not associated with any ESI (i.e. an orphan port).

Example 4 provides the method according to Example 3, where the EVPN instance RT is a Route-Import RT auto-derived from a Virtual Network Instance (VNI).

Example 5 provides the method according to Example 3, where the EVPN instance RT is a Route-Import RT auto-derived from a Multi-Protocol Label Switching (MPLS) label.

In other Examples, the EVPN instance RT may be a Route-Import RT configured by an operator.

Example 6 provides the method according to Example 2, further including receiving, at the non-DF PE device, a further route advertisement message including the ES-Import RT; establishing, by the non-DF PE device, that the ES-Import RT matches said ESI (i.e., establishing that the RT in said further BGP update message matches one of the ESIs local to the non-DF PE device); and adding data contained in the further route advertisement message to an Internet Group Management Protocol (IGMP) synchronization listing of the non-DF PE device.

Example 7 provides the method according to Example 6, further including, when the non-DF PE device becomes elected to be the DF for said host device, sending a further route advertisement message including said ES-Import RT and an EVPN Instance RT based on said IGMP synchronization listing (i.e. the previously non-DF PE that now became the DF PE re-originates (i.e. re-sends) the update message by adding an EVPN Instance RT to it).

Example 8 provides a computer-implemented method for assisting forwarding of multicast traffic over an Ethernet Virtual Private Network (EVPN) fabric from a multicast source to a host device multi-homed to a plurality of provider edge (PE) devices. The method includes receiving, at a PE device elected, out of said plurality of PE devices, to be a designated forwarder (DF) for said host device (DF PE device), a route advertisement message; determining, by the DF PE device, that the route advertisement message includes an Ethernet Segment (ES)-Import Route Target (RT); establishing, by the DF PE device, that the ES-Import RT matches an Ethernet Segment Identification (ESI) for an Ethernet communication link between said host device and the DF PE device (i.e., establishing that the RT in said advertisement message matches one of the ESIs local to the DF PE device); and sending, by the DF PE device, a further route advertisement message, where the second route advertisement message includes said ES-Import RT and an EVPN Instance RT (i.e. the DF PE re-originates (i.e. sends) the received update message by adding an EVPN Instance RT to it).

Example 9 provides the method according to Example 8, where the route advertisement message is a Selective Multicast Ethernet Tag (SMET) route message of Border Gateway Protocol (BGP), i.e. a route advertisement message advertising one or more Internet Protocol (IP) prefixes of one or more hosts, which IP prefixes were received at said non-DF PE device from said one or more hosts as a part of the IGMP join message.

Example 10 provides the method according to Example 9, further including, after establishing that the ES-Import RT matches at least one ESI for the Ethernet communication link between said host device and the DF PE device, adding data contained in the ES-Import RT to an Internet Group Management Protocol (IGMP) synchronization listing of the DF PE device.

Example 11 provides the method according to Example 10, further including when the DF PE device is no longer elected to be the DF for said CE device, withdrawing routes included in said second BGP update message, based on said IGMP synchronization listing.

Example 12 provides the method according to Example 10, further including receiving the multicast traffic for the host device and forwarding the multicast traffic to the host device based on the IGMP synchronization listing.

Example 13 provides the method according to Example 9, where, when the route advertisement message includes an EVPN Instance RT, the method further includes the DF PE device accepting a route specified by the EVPN Instance RT (i.e. in this case the DF PE device accepts the route specified in the received update message but does not re-originate it).

Example 14 provides the method according to Example 13, where the EVPN Instance RT is a Route-Import RT based on a Virtual Network Instance (VNI) (i.e. a VNI-based RT) or a Route-Import RT based on a Multi-Protocol Label Switching (MPLS) (i.e. an MPLS-based RT).

Further Examples provides a system configured to carry out the method according to any one of the preceding Examples. The system may include at least one memory element configured to store computer executable instructions, and at least one processor coupled to the at least one memory element and configured, when executing the instructions, to carry out the method according to any one of the preceding Examples.

Further Examples provides a computer-readable storage medium, preferably non-transitory, encoding logic that include instructions for execution that, when executed by a processor, are operable to perform the method according to any one of the preceding Examples.

Variations and Implementations

It is important to note that the steps in the appended diagrams illustrate only some of the possible scenarios and patterns that may be executed by, or within, the network environment shown in FIGURES. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding example operations and use cases have been offered for purposes of example and discussion. Substantial flexibility is provided by the network environment shown in FIGURES in that any suitable arrangements, chronologies, configurations, and timing mechanisms may be provided without departing from the teachings provided herein.

As used herein in this Specification, the term 'network element', such as e.g. any of the PEs 120 and any of the remote PEs 130 or the system 140, is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate operations thereof related to solutions described herein. This may be inclusive of appropriate algorithms and communication protocols that allow for the effective exchange of data or information.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims may be presented in single dependency format in the style used before the USPTO, it should be understood that any claim can depend on and be combined with any preceding claim of the same type unless that is clearly technically infeasible.

What is claimed is:

1. A computer-implemented method for assisting forwarding of multicast traffic over an Ethernet Virtual Private Network (EVPN) fabric from a multicast source to a host device multi-homed to a plurality of provider edge devices, the method comprising:
   receiving, at a non-designated forwarder provider edge device out of said plurality of provider edge devices, for said host device, a multicast join message;
   sending, by the non-designated forwarder provider edge device, a first route advertisement message that includes an Ethernet Segment-Import Route Target when the multicast join message is received at a port of the non-designated forwarder provider edge device that is associated with an Ethernet Segment Identification for a set of Ethernet communication links between said host device and each of the plurality of provider edge devices; and
   sending, by the non-designated forwarder provider edge device, a second route advertisement message that includes an EVPN Instance Route Target when the multicast join message is received at a port of the non-designated forwarder provider edge device that is not associated with any segment identification.

2. The method of claim 1, wherein the first route advertisement message is a Selective Multicast Ethernet Tag route message of Border Gateway Protocol.

3. The method of claim 1, wherein the multicast join message is a Multicast Listener Discovery (MLD) message.

4. The method of claim 1, wherein the EVPN instance Route Target is a Route-Import Route Target auto-derived from a Virtual Network Instance.

5. The method of claim 1, wherein the EVPN instance Route Target is a Route-Import Route Target auto-derived from a Multi-Protocol Label Switching label.

6. The method of claim 1, wherein the multicast join message is an Internet Group Management Protocol (IGMP) join message.

7. The method of claim 1, further comprising:
   receiving, at the non-designated forwarder provider edge device, a third route advertisement message comprising the Ethernet Segment-Import Route Target;
   determining, by the non-designated forwarder provider edge device, that the Ethernet Segment-Import Route Target matches said segment identification; and
   adding data contained in the third route advertisement message to a listing maintained by the non-designated forwarder provider edge device.

8. The method of claim 7, further comprising:
   when the non-designated forwarder provider edge device becomes elected to be a designated forwarder for said host device, sending a fourth route advertisement message including said Ethernet Segment-Import Route Target and an EVPN Instance Route Target based on the listing.

9. An apparatus for assisting forwarding of multicast traffic over an Ethernet Virtual Private Network (EVPN) fabric from a multicast source to a host device multi-homed to a plurality of provider edge devices, the apparatus configured to serve as a non-designated forwarder provider edge device among the plurality of provider edge devices, the apparatus comprising:
   a communication interface; and
   at least one processor coupled to the communication interface and configured to:
   receive a multicast join message;
   send a first route advertisement message that includes an Ethernet Segment-Import Route Target when the multicast join message is received at a port that is associated with an Ethernet Segment Identification for a set of Ethernet communication links between said host device and each of the plurality of provider edge devices; and
   send a second route advertisement message that includes an EVPN Instance Route Target when the multicast join message is received at a port that is not associated with any segment identification.

10. The apparatus of claim 9, wherein the EVPN instance Route Target is a Route-Import Route Target auto-derived from a Virtual Network Instance.

11. The apparatus of claim 9, wherein the multicast join message is a Multicast Listener Discovery (MLD) message.

12. The apparatus of claim 9, wherein the first route advertisement message is a Selective Multicast Ethernet Tag route message of Border Gateway Protocol.

13. The apparatus of claim 9, wherein the EVPN instance Route Target is a Route-Import Route Target auto-derived from a Multi-Protocol Label Switching label.

14. The apparatus of claim 9, wherein the multicast join message is an Internet Group Management Protocol (IGMP) join message.

15. The apparatus of claim 9, wherein the at least one processor is further configured to:
   receive a third route advertisement message comprising the Ethernet Segment-Import Route Target;
   establish that the Ethernet Segment-Import Route Target matches said segment identification; and
   add data contained in the third route advertisement message to a listing.

16. A non-transitory computer-readable storage media encoded with software comprising computer executable instructions which, when executed by a processor of a non-designated forwarder provider edge device, out of a plurality of provider edge devices, for a host device, cause the processor to:

receive a multicast join message;

send a first route advertisement message that includes an Ethernet Segment-Import Route Target when the multicast join message is received at a port, of the non-designated forwarder provider edge device, that is associated with an Ethernet Segment Identification for a set of Ethernet communication links between the host device and each of the plurality of provider edge devices; and send a second route advertisement message that includes an Ethernet Virtual Private Network (EVPN) Instance Route Target when the multicast join message is received at a port of the non-designated forwarder provider edge device that is not associated with any segment identification.

17. The non-transitory computer-readable storage media according to claim 16, wherein the first route advertisement message is a Selective Multicast Ethernet Tag route message of Border Gateway Protocol.

18. The non-transitory computer-readable storage media according to claim 16, wherein the multicast join message is a Multicast Listener Discovery (MLD) message.

19. The non-transitory computer-readable storage media according to claim 16, wherein the multicast join message is an Internet Group Management Protocol (IGMP) join message.

20. The non-transitory computer-readable storage media according to claim 16, wherein the instructions further cause the processor to:

receive a third route advertisement message comprising the Ethernet Segment-Import Route Target;

establish that the Ethernet Segment-Import Route Target matches the segment identification; and add data contained in the third route advertisement message to a listing.

\* \* \* \* \*